(12) United States Patent
Zhang et al.

(10) Patent No.: US 11,533,201 B2
(45) Date of Patent: Dec. 20, 2022

(54) ENHANCED TRANSMISSION OPPORTUNITIES FOR SOUNDING REFERENCE SIGNALS

(71) Applicant: QUALCOMM Incorporated, San Diego, CA (US)

(72) Inventors: Xiaoxia Zhang, San Diego, CA (US); Tanumay Datta, Bangalore (IN); Jing Sun, San Diego, CA (US); Ananta Narayanan Thyagarajan, Bangalore (IN); Kapil Bhattad, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 44 days.

(21) Appl. No.: 16/909,532

(22) Filed: Jun. 23, 2020

(65) Prior Publication Data

US 2020/0412581 A1 Dec. 31, 2020

(30) Foreign Application Priority Data

Jun. 28, 2019 (IN) .............................. 201941025870

(51) Int. Cl.
*H04L 25/02* (2006.01)
*H04L 5/00* (2006.01)
(Continued)

(52) U.S. Cl.
CPC ........ *H04L 25/0226* (2013.01); *H04L 5/0051* (2013.01); *H04W 72/0446* (2013.01); *H04W 72/14* (2013.01); *H04W 74/0808* (2013.01)

(58) Field of Classification Search
CPC ............... H04L 25/0226; H04L 5/0051; H04L 25/0224; H04L 5/0096; H04L 5/0094;
(Continued)

(56) References Cited

U.S. PATENT DOCUMENTS 11,223,506 B2 * 1/2022 Papasakellariou .... H04L 5/0057
2017/0290040 A1 * 10/2017 Dinan ................. H04L 27/0006
(Continued)

FOREIGN PATENT DOCUMENTS

| WO | WO-2017167304 A1 | 10/2017 | |
| WO | WO-2018203650 A1 * | 11/2018 | ........... H04L 1/0013 |
| WO | WO-2020145773 A1 * | 7/2020 | ............ H04W 72/04 |

OTHER PUBLICATIONS

"3rd Generation Partnership Project; Technical Specification Group Radio Access Network; NR; Physical layer procedures for data (Release 15)", 3GPP Draft, R1-1721344_WITH_TRACK_CHANGES, 3rd Generation Partnership Project (3GPP), Mobile Competence Centre, 650, Route Des Lucioles, F-06921, Sophia-Antipolis Cedex, France, Dec. 15, 2017 (Dec. 15, 2017), XP051370851, pp. 1-71, Retrieved from the Internet: URL: http://www.3gpp.org/ftp/tsg%5Fran/WG1%5FRL1/TSGR1%5F91/Docs/ [retrieved on Dec. 15, 2017] p. 63-p. 65.
(Continued)

*Primary Examiner* — Justin T Van Roie
(74) *Attorney, Agent, or Firm* — Liem T. Do

(57) ABSTRACT

Enhanced transmission opportunities are disclosed for sounding reference signals (SRS). The enhancements may provide more flexibility in scheduling SRS transmission and more SRS transmission opportunities. An additional offset may be defined and dynamically communicated to a user equipment (UE) to use either to override or in additional to a semi-statically communicated standard offset when scheduling the SRS transmission opportunity based on an SRS trigger slot or another granted slot. The UE may further treat each combination of timing information as a separate SRS opportunity or may define a window between two signaled timing offsets within which the UE may attempt SRS transmissions.

18 Claims, 12 Drawing Sheets

(51) Int. Cl.
*H04W 74/08* (2009.01)
*H04W 72/14* (2009.01)
*H04W 72/04* (2009.01)

(58) Field of Classification Search
CPC .............. H04W 74/0808; H04W 72/14; H04W 72/0446; H04W 16/14
See application file for complete search history.

(56) References Cited

U.S. PATENT DOCUMENTS

2019/0045529 A1* 2/2019 Xiong ............... H04W 72/0406
2019/0215110 A1 7/2019 Yang et al.

OTHER PUBLICATIONS

International Search Report and Written Opinion—PCT/US2020/039252—ISA/EPO—dated Nov. 11, 2020.
Sony: "Summary of SRS," 3GPP Draft, 3GPP TSG RAN WG1 Ad Hoc-1801 Meeting, R1-1801178—Summary of SRS V0.6, 3rd Generation Partnership Project (3GPP), Mobile Competence Centre, 650, Route Des Lucioles, F-06921, Sophia-Antipolis Cedex, France, vol. RAN WG1. No. Vancouver; Jan. 22, 2018-Jan. 26, 2018, Jan. 29, 2018 (Jan. 29, 2018), XP051385409, 53 pages, Retrieved from the Internet: URL: http://www.3gpp.org/ftp/tsg%5Fran/WG1%5FRL1/TSGR1%5FAH/NR%5FAH%5F1801/Docs/ [retrieved on Jan. 29, 2018] p. 2 p. 32-p. 33.

* cited by examiner

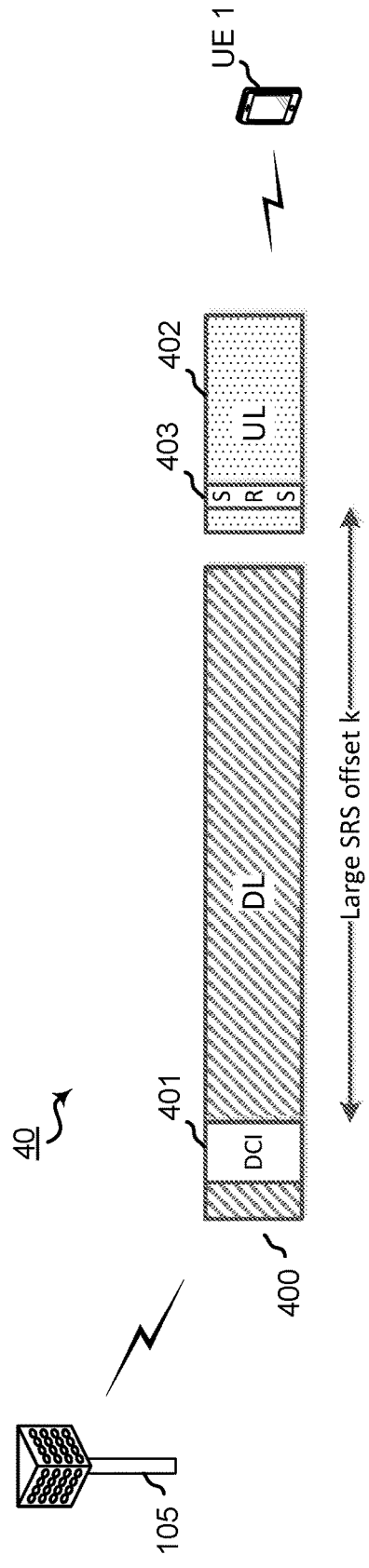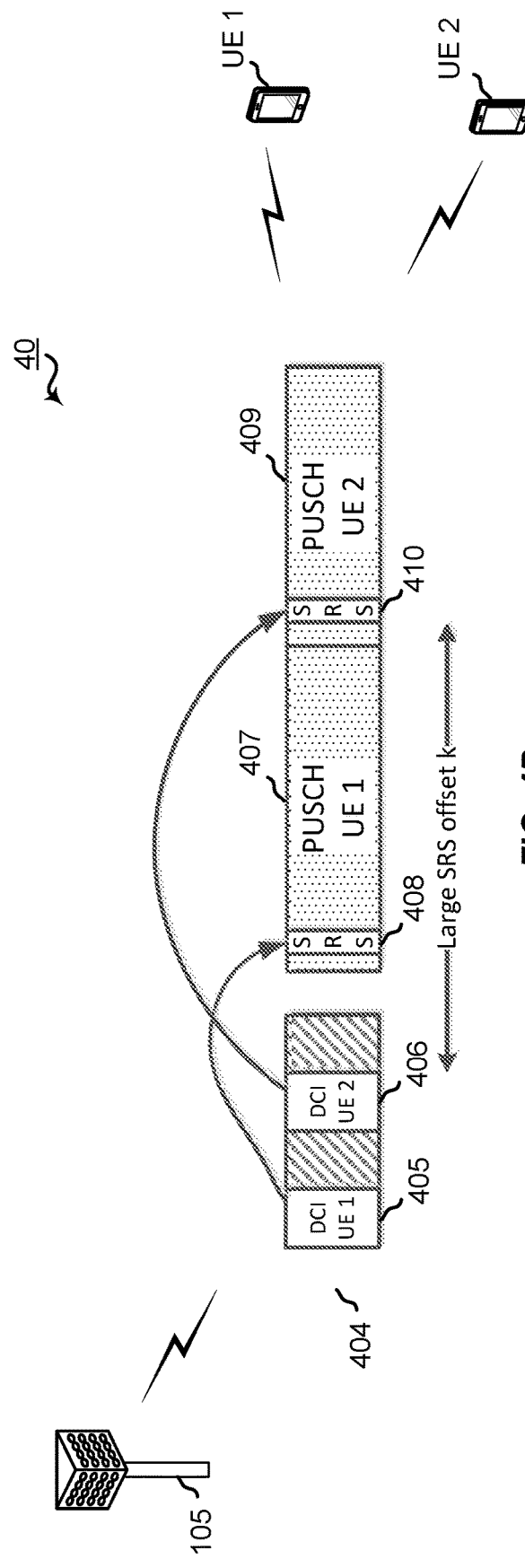
FIG. 4A
FIG. 4B

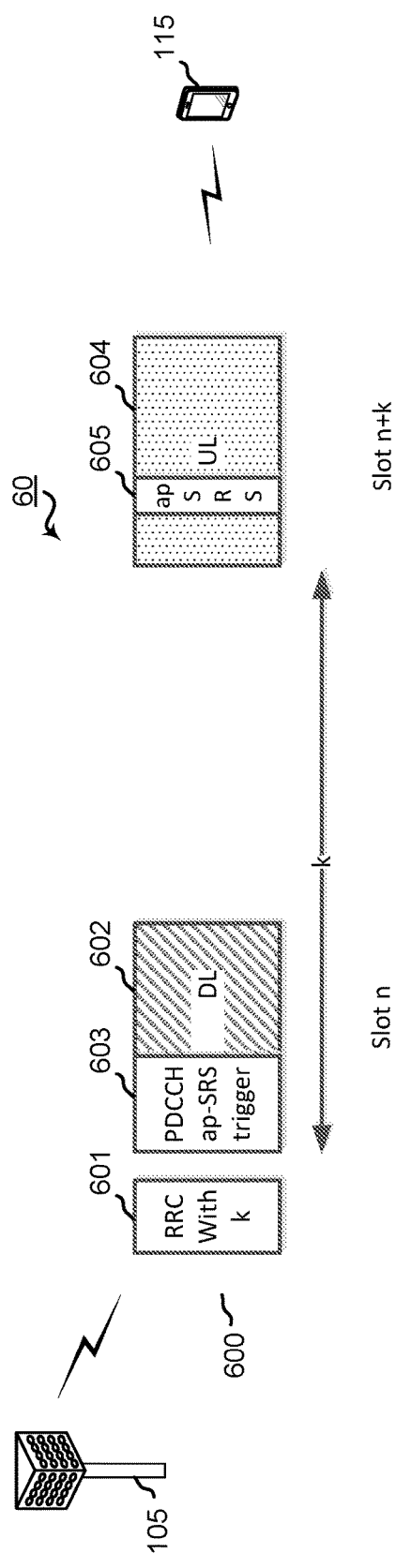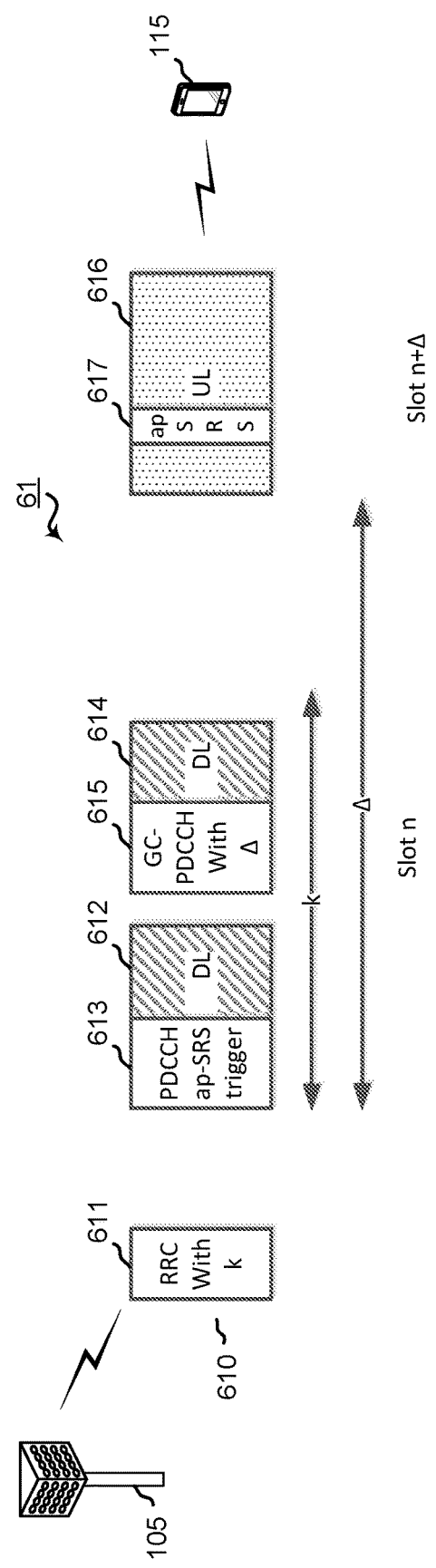
FIG. 6A
FIG. 6B

ENHANCED TRANSMISSION OPPORTUNITIES FOR SOUNDING REFERENCE SIGNALS

CROSS-REFERENCE TO RELATED APPLICATIONS

This application claims the benefit of Indian Patent Application No. 201941025870, entitled, "ENHANCED TRANSMISSION OPPORTUNITIES FOR SOUNDING REFERENCE SIGNALS," filed on Jun. 28, 2019, which is expressly incorporated by reference herein in its entirety.

BACKGROUND

Field

Aspects of the present disclosure relate generally to wireless communication systems, and more particularly, to enhanced transmission opportunities for sounding reference signals (SRS).

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In one aspect of the disclosure, a method of wireless communication includes semi-statically receiving, by a user equipment (UE), a standard offset for determination of a sounding reference signal (SRS) transmission time, dynamically receiving, by the UE, an SRS trigger at a trigger slot, dynamically receiving, by the UE, an additional offset associated with the SRS transmission time, determining, by the UE, the SRS transmission time as a function of at least one or more of: the standard offset, the trigger slot, and the additional offset, and transmitting, by the UE, an SRS at a next uplink opportunity after the SRS transmission time.

In an additional aspect of the disclosure, a method of wireless communication includes semi-statically receiving, by a UE, a standard offset for determination of a SRS transmission, dynamically receiving, by the UE, an SRS trigger at a trigger slot, dynamically receiving, by the UE, one or more additional offsets associated with the SRS transmission time, determining, by the UE, a plurality of candidate SRS transmission times as a function of the standard offset, an initial slot, and the one or more additional offsets, wherein the initial slots includes one of: the trigger slot, a configured uplink slot, or a configured flexible slot, attempting, by the UE, uplink access at successive ones of the plurality of candidate SRS transmission times, and transmitting, by the UE, an SRS at a first slot of the plurality of candidate SRS transmission times having success of the uplink access.

In an additional aspect of the disclosure, an apparatus configured for wireless communication includes means for semi-statically receiving, by a UE, a standard offset for determination of a SRS transmission time, means for dynamically receiving, by the UE, an SRS trigger at a trigger slot, means for dynamically receiving, by the UE, an additional offset associated with the SRS transmission time, means for determining, by the UE, the SRS transmission time as a function of at least one or more of: the standard offset, the trigger slot, and the additional offset, and means for transmitting, by the UE, an SRS at a next uplink opportunity after the SRS transmission time.

In an additional aspect of the disclosure, an apparatus configured for wireless communication includes means for semi-statically receiving, by a UE, a standard offset for determination of a SRS transmission, means for dynamically receiving, by the UE, an SRS trigger at a trigger slot, means for dynamically receiving, by the UE, one or more additional offsets associated with the SRS transmission time, means for determining, by the UE, a plurality of candidate SRS transmission times as a function of the standard offset, an initial slot, and the one or more additional offsets, wherein the initial slots includes one of: the trigger slot, a configured uplink slot, or a configured flexible slot, means for attempting, by the UE, uplink access at successive ones of the plurality of candidate SRS transmission times, and means for transmitting, by the UE, an SRS at a first slot of the plurality of candidate SRS transmission times having success of the uplink access.

In an additional aspect of the disclosure, a non-transitory computer-readable medium having program code recorded thereon. The program code further includes code to semi-statically receive, by a UE, a standard offset for determination of a SRS transmission time, code to dynamically receive, by the UE, an SRS trigger at a trigger slot, code to dynamically receive, by the UE, an additional offset associated with the SRS transmission time, code to determine, by the UE, the SRS transmission time as a function of at least one or more of: the standard offset, the trigger slot, and the additional offset, and code to transmit, by the UE, an SRS at a next uplink opportunity after the SRS transmission time.

In an additional aspect of the disclosure, a non-transitory computer-readable medium having program code recorded thereon. The program code further includes code to semi-statically receive, by a UE, a standard offset for determination of a SRS transmission, code to dynamically receive, by the UE, an SRS trigger at a trigger slot, code to dynamically receive, by the UE, one or more additional offsets associated with the SRS transmission time, code to determine, by the UE, a plurality of candidate SRS transmission times as a function of the standard offset, an initial slot, and the one or more additional offsets, wherein the initial slots includes one of: the trigger slot, a configured uplink slot, or a configured flexible slot, code to attempt, by the UE, uplink access at successive ones of the plurality of candidate SRS transmission times, and code to transmit, by the UE, an SRS at a first slot of the plurality of candidate SRS transmission times having success of the uplink access.

In an additional aspect of the disclosure, an apparatus configured for wireless communication is disclosed. The apparatus includes at least one processor, and a memory coupled to the processor. The processor is configured to semi-statically receive, by a UE, a standard offset for determination of a SRS transmission time, to dynamically receive, by the UE, an SRS trigger at a trigger slot, to dynamically receive, by the UE, an additional offset associated with the SRS transmission time, to determine, by the UE, the SRS transmission time as a function of at least one or more of: the standard offset, the trigger slot, and the additional offset, and to transmit, by the UE, an SRS at a next uplink opportunity after the SRS transmission time.

In an additional aspect of the disclosure, an apparatus configured for wireless communication is disclosed. The apparatus includes at least one processor, and a memory coupled to the processor. The processor is configured to semi-statically receive, by a UE, a standard offset for determination of a SRS transmission, to dynamically receive, by the UE, an SRS trigger at a trigger slot, to dynamically receive, by the UE, one or more additional offsets associated with the SRS transmission time, to determine, by the UE, a plurality of candidate SRS transmission times as a function of the standard offset, an initial slot, and the one or more additional offsets, wherein the initial slots includes one of: the trigger slot, a configured uplink slot, or a configured flexible slot, to attempt, by the UE, uplink access at successive ones of the plurality of candidate SRS transmission times, and to transmit, by the UE, an SRS at a first slot of the plurality of candidate SRS transmission times having success of the uplink access.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIGS. 4A and 4B are block diagrams illustrating portions of an NR-U network where UEs are implemented for ap-SRS.

FIG. 6A is a block diagram illustrating a portion of an NR-U network having a UE configured for ap-SRS transmissions.

FIGS. 6B-6D are block diagrams illustrating portions of an NR-U network having a UE configured for ap-SRS transmissions according to aspects of the present disclosure.

DETAILED DESCRIPTION

Figure 1:
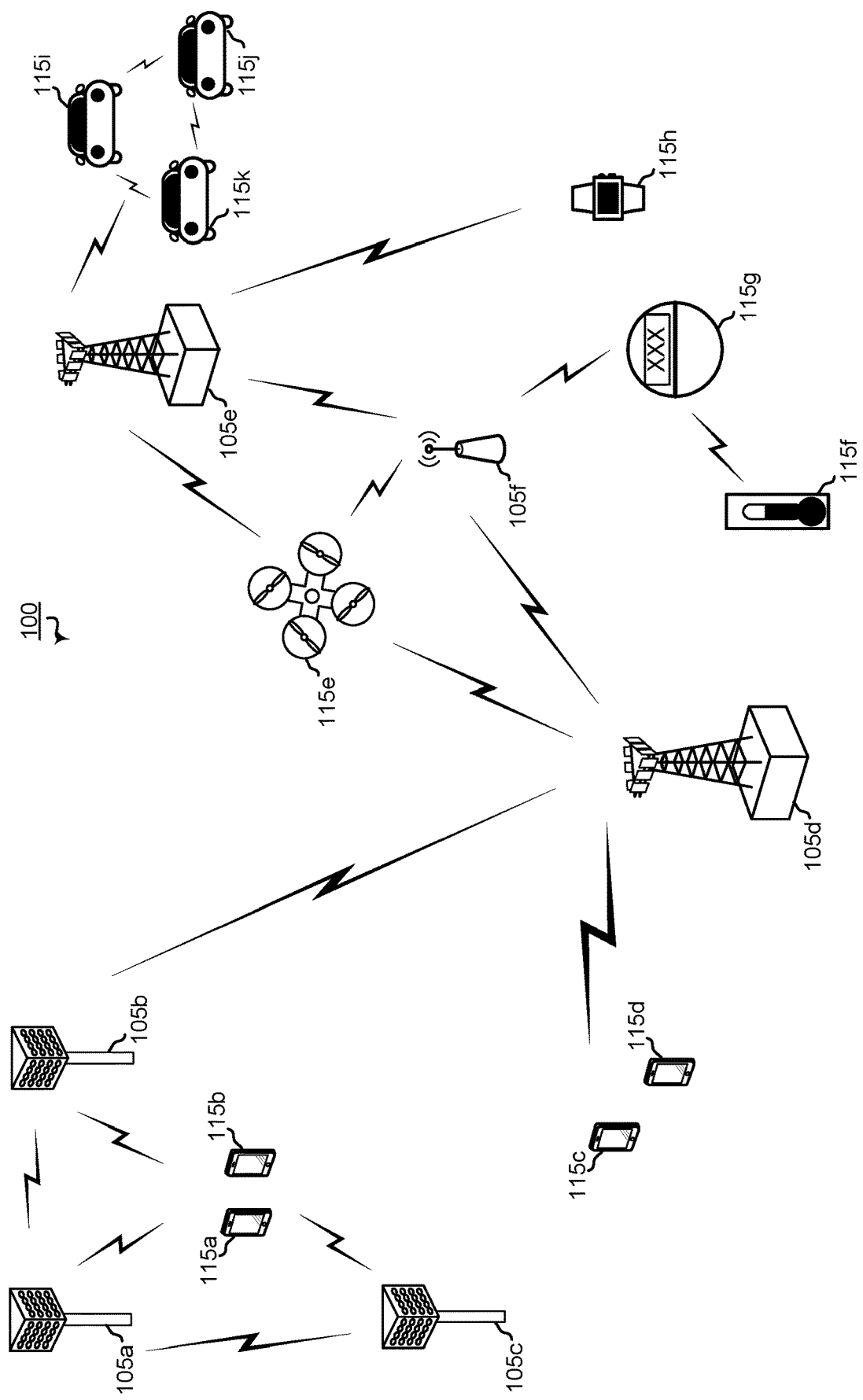
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., —99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various base stations and UEs configured according to aspects of the present disclosure. The 5G network 100 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE may be a device that includes a Universal Integrated Circuit Card (UICC). In another aspect, a UE may be a device that does not include a UICC. In some aspects, UEs that do not include UICCs may also be referred to as internet of everything (IoE) or internet of things (IoT) devices. UEs 115a-115d are examples of mobile smart phone-type devices accessing 5G network 100 A UE may also be a machine specifically configured for connected communication, including machine type communication (MTC), enhanced MTC (eMTC), narrowband IoT (NB-IoT) and the like. UEs 115e-115k are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In operation at 5G network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through 5G network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. 5G network 100 may also provide additional network efficiency through dynamic, low-latency TDD/FDD communications, such as in a vehicle-to-vehicle (V2V) mesh network between UEs 115i-115k communicating with macro base station 105e.

Figure 2:
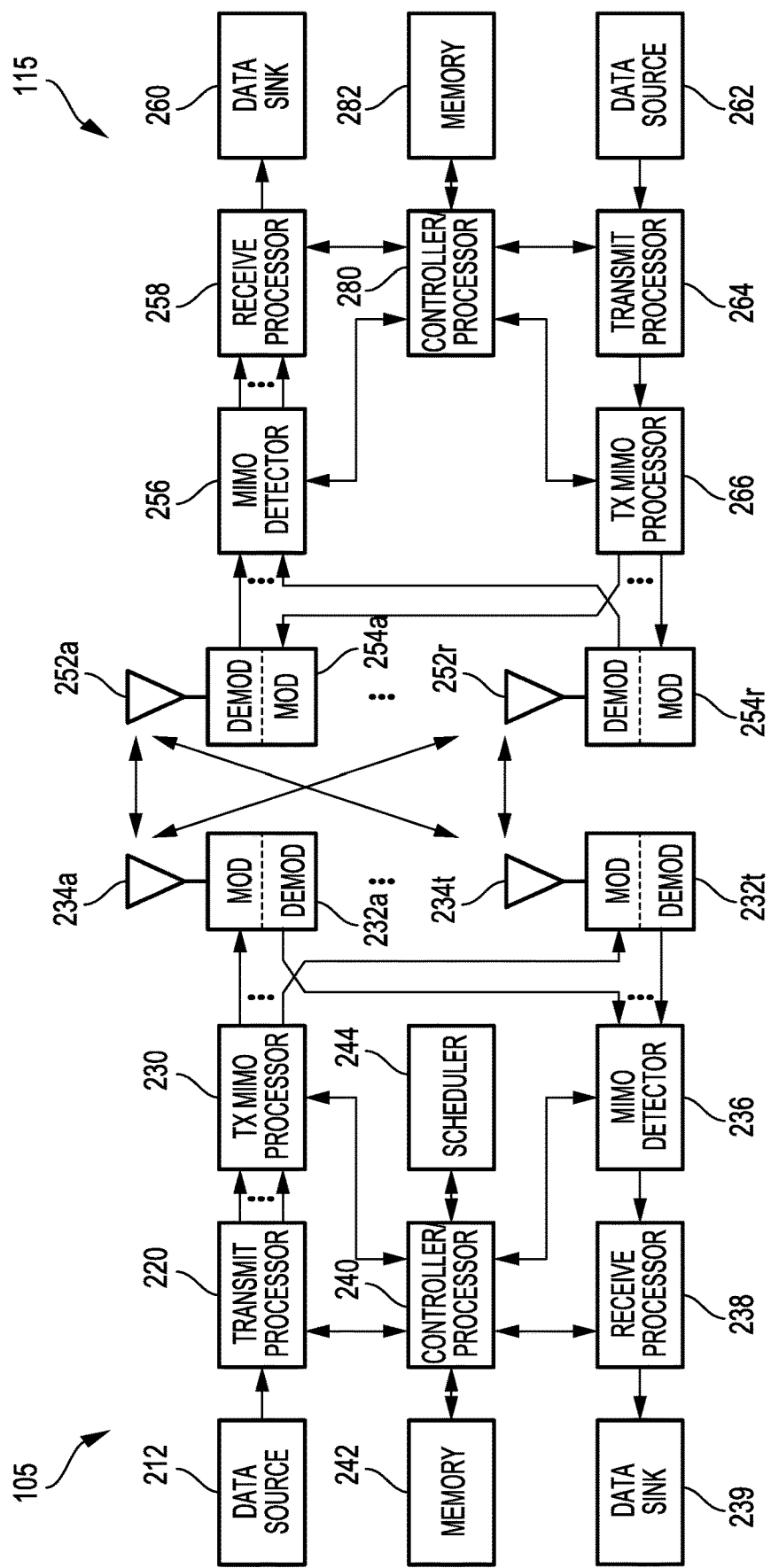
FIG. 2 is a block diagram illustrating a design of a base station and a UE configured according to one aspect of the present disclosure.

FIG. 2 shows a block diagram of a design of a base station 105 and a UE 115, which may be one of the base station and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIGS. 5 and 8, and/or other processes for the techniques described herein. The memories 242 and 282 may store data and program codes for the base station 105 and the UE 115, respectively. A scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 of the 5G network 100 (FIG. 1) may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Use of a medium-sensing procedure to contend for access to an unlicensed shared spectrum may result in communication inefficiencies. This may be particularly evident when multiple network operating entities (e.g., network operators) are attempting to access a shared resource. In the 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 3:
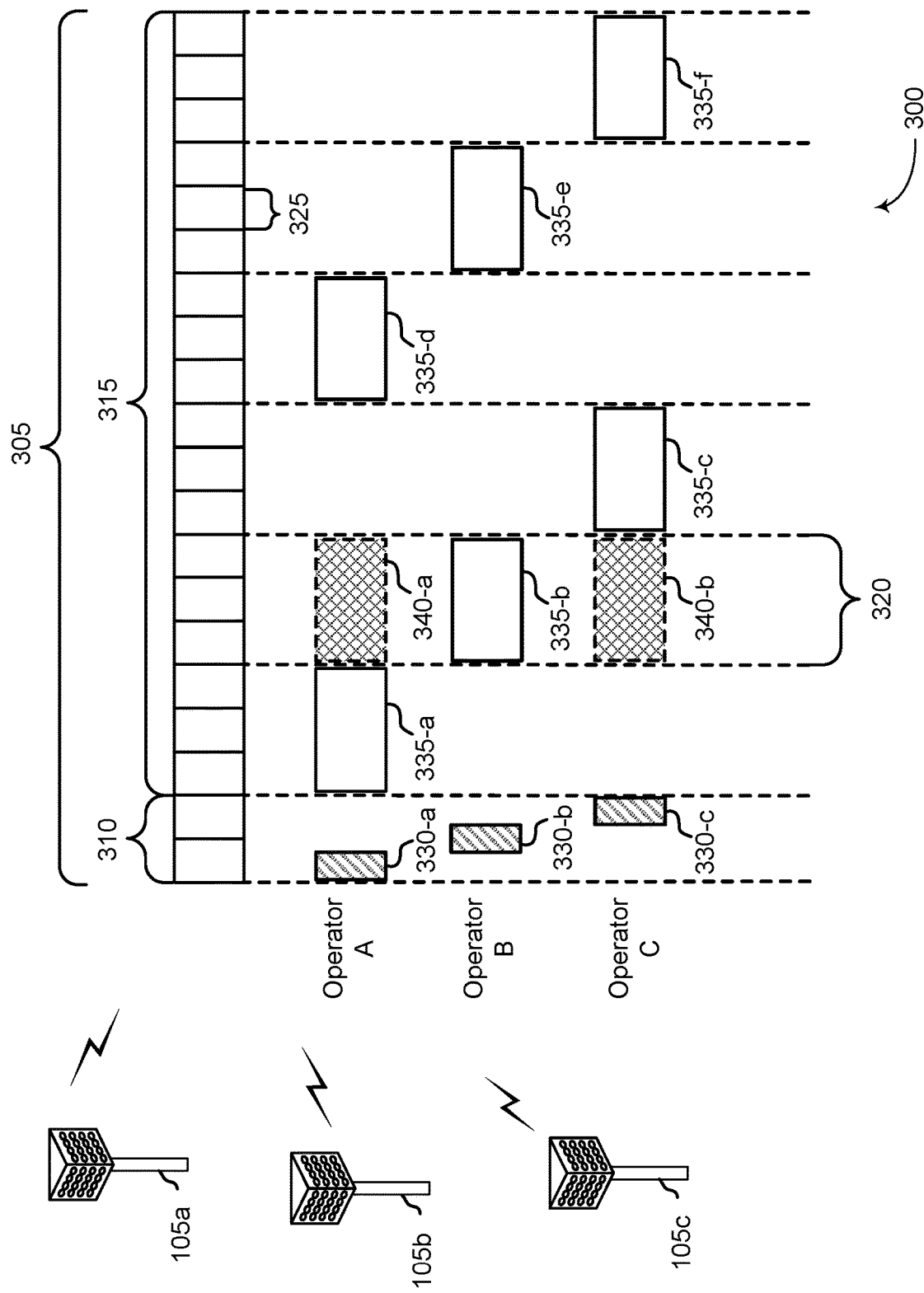
FIG. 3 is a block diagram illustrating a wireless communication system including base stations that use directional wireless beams.

FIG. 3 illustrates an example of a timing diagram 300 for coordinated resource partitioning. The timing diagram 300 includes a superframe 305, which may represent a fixed duration of time (e.g., 20 ms). The superframe 305 may be repeated for a given communication session and may be used by a wireless system such as 5G network 100 described with reference to FIG. 1. The superframe 305 may be divided into intervals such as an acquisition interval (A-INT) 310 and an arbitration interval 315. As described in more detail below, the A-INT 310 and arbitration interval 315 may be subdivided into sub-intervals, designated for certain resource types, and allocated to different network operating entities to facilitate coordinated communications between the different network operating entities. For example, the arbitration interval 315 may be divided into a plurality of sub-intervals 320. Also, the superframe 305 may be further divided into a plurality of subframes 325 with a fixed duration (e.g., 1 ms). While timing diagram 300 illustrates three different network operating entities (e.g., Operator A, Operator B, Operator C), the number of network operating entities using the superframe 305 for coordinated communications may be greater than or fewer than the number illustrated in timing diagram 300.

The A-INT 310 may be a dedicated interval of the superframe 305 that is reserved for exclusive communications by the network operating entities. In some examples, each network operating entity may be allocated certain resources within the A-INT 310 for exclusive communications. For example, resources 330-a may be reserved for exclusive communications by Operator A, such as through base station 105a, resources 330-b may be reserved for exclusive communications by Operator B, such as through base station 105b, and resources 330-c may be reserved for exclusive communications by Operator C, such as through base station 105c. Since the resources 330-a are reserved for exclusive communications by Operator A, neither Operator B nor Operator C can communicate during resources 330-*a*, even if Operator A chooses not to communicate during those resources. That is, access to exclusive resources is limited to the designated network operator. Similar restrictions apply to resources 330-*b* for Operator B and resources 330-*c* for Operator C. The wireless nodes of Operator A (e.g, UEs 115 or base stations 105) may communicate any information desired during their exclusive resources 330-*a*, such as control information or data.

When communicating over an exclusive resource, a network operating entity does not need to perform any medium sensing procedures (e.g., listen-before-talk (LBT) or clear channel assessment (CCA)) because the network operating entity knows that the resources are reserved. Because only the designated network operating entity may communicate over exclusive resources, there may be a reduced likelihood of interfering communications as compared to relying on medium sensing techniques alone (e.g., no hidden node problem). In some examples, the A-INT 310 is used to transmit control information, such as synchronization signals (e.g., SYNC signals), system information (e.g., system information blocks (SIBs)), paging information (e.g., physical broadcast channel (PBCH) messages), or random access information (e.g., random access channel (RACH) signals). In some examples, all of the wireless nodes associated with a network operating entity may transmit at the same time during their exclusive resources.

In some examples, resources may be classified as prioritized for certain network operating entities. Resources that are assigned with priority for a certain network operating entity may be referred to as a guaranteed interval (G-INT) for that network operating entity. The interval of resources used by the network operating entity during the G-INT may be referred to as a prioritized sub-interval. For example, resources 335-*a* may be prioritized for use by Operator A and may therefore be referred to as a G-INT for Operator A (e.g., G-INT-OpA). Similarly, resources 335-*b* may be prioritized for Operator B (e.g., G-INT-OpB), resources 335-*c* (e.g., G-INT-OpC) may be prioritized for Operator C, resources 335-*d* may be prioritized for Operator A, resources 335-*e* may be prioritized for Operator B, and resources 335-*f* may be prioritized for Operator C.

The various G-INT resources illustrated in FIG. 3 appear to be staggered to illustrate their association with their respective network operating entities, but these resources may all be on the same frequency bandwidth. Thus, if viewed along a time-frequency grid, the G-INT resources may appear as a contiguous line within the superframe 305. This partitioning of data may be an example of time division multiplexing (TDM). Also, when resources appear in the same sub-interval (e.g., resources 340-*a* and resources 335-*b*), these resources represent the same time resources with respect to the superframe 305 (e.g., the resources occupy the same sub-interval 320), but the resources are separately designated to illustrate that the same time resources can be classified differently for different operators.

When resources are assigned with priority for a certain network operating entity (e.g., a G-INT), that network operating entity may communicate using those resources without having to wait or perform any medium sensing procedures (e.g., LBT or CCA). For example, the wireless nodes of Operator A are free to communicate any data or control information during resources 335-*a* without interference from the wireless nodes of Operator B or Operator C.

A network operating entity may additionally signal to another operator that it intends to use a particular G-INT. For example, referring to resources 335-*a*, Operator A may signal to Operator B and Operator C that it intends to use resources 335-*a*. Such signaling may be referred to as an activity indication. Moreover, since Operator A has priority over resources 335-*a*, Operator A may be considered as a higher priority operator than both Operator B and Operator C. However, as discussed above, Operator A does not have to send signaling to the other network operating entities to ensure interference-free transmission during resources 335-*a* because the resources 335-*a* are assigned with priority to Operator A.

Similarly, a network operating entity may signal to another network operating entity that it intends not to use a particular G-INT. This signaling may also be referred to as an activity indication. For example, referring to resources 335-*b*, Operator B may signal to Operator A and Operator C that it intends not to use the resources 335-*b* for communication, even though the resources are assigned with priority to Operator B. With reference to resources 335-*b*, Operator B may be considered a higher priority network operating entity than Operator A and Operator C. In such cases, Operators A and C may attempt to use resources of sub-interval 320 on an opportunistic basis. Thus, from the perspective of Operator A, the sub-interval 320 that contains resources 335-*b* may be considered an opportunistic interval (O-INT) for Operator A (e.g., O-INT-OpA). For illustrative purposes, resources 340-*a* may represent the O-INT for Operator A. Also, from the perspective of Operator C, the same sub-interval 320 may represent an O-INT for Operator C with corresponding resources 340-*b*. Resources 340-*a*, 335-*b*, and 340-*b* all represent the same time resources (e.g., a particular sub-interval 320), but are identified separately to signify that the same resources may be considered as a G-INT for some network operating entities and yet as an O-INT for others.

To utilize resources on an opportunistic basis, Operator A and Operator C may perform medium-sensing procedures to check for communications on a particular channel before transmitting data. For example, if Operator B decides not to use resources 335-*b* (e.g., G-INT-OpB), then Operator A may use those same resources (e.g., represented by resources 340-*a*) by first checking the channel for interference (e.g., LBT) and then transmitting data if the channel was determined to be clear. Similarly, if Operator C wanted to access resources on an opportunistic basis during sub-interval 320 (e.g., use an O-INT represented by resources 340-*b*) in response to an indication that Operator B was not going to use its G-INT (e.g., resources 335-*b*), Operator C may perform a medium sensing procedure and access the resources if available. In some cases, two operators (e.g., Operator A and Operator C) may attempt to access the same resources, in which case the operators may employ contention-based procedures to avoid interfering communications. The operators may also have sub-priorities assigned to them designed to determine which operator may gain access to resources if more than operator is attempting access simultaneously. For example, Operator A may have priority over Operator C during sub-interval 320 when Operator B is not using resources 335-*b* (e.g., G-INT-OpB). It is noted that in another sub-interval (not shown) Operator C may have priority over Operator A when Operator B is not using its G-INT.

In some examples, a network operating entity may intend not to use a particular G-INT assigned to it, but may not send out an activity indication that conveys the intent not to use the resources. In such cases, for a particular sub-interval 320, lower priority operating entities may be configured to monitor the channel to determine whether a higher priority operating entity is using the resources. If a lower priority operating entity determines through LBT or similar method that a higher priority operating entity is not going to use its G-INT resources, then the lower priority operating entities may attempt to access the resources on an opportunistic basis as described above.

In some examples, access to a G-INT or O-INT may be preceded by a reservation signal (e.g., request-to-send (RTS)/clear-to-send (CTS)), and the contention window (CW) may be randomly chosen between one and the total number of operating entities.

In some examples, an operating entity may employ or be compatible with coordinated multipoint (CoMP) communications. For example an operating entity may employ CoMP and dynamic time division duplex (TDD) in a G-INT and opportunistic CoMP in an O-INT as needed.

In the example illustrated in FIG. 3, each sub-interval 320 includes a G-INT for one of Operator A, B, or C. However, in some cases, one or more sub-intervals 320 may include resources that are neither reserved for exclusive use nor reserved for prioritized use (e.g., unassigned resources). Such unassigned resources may be considered an O-INT for any network operating entity, and may be accessed on an opportunistic basis as described above.

In some examples, each subframe 325 may contain 14 symbols (e.g., 250-μs for 60 kHz tone spacing). These subframes 325 may be standalone, self-contained Interval-Cs (ITCs) or the subframes 325 may be a part of a long ITC. An ITC may be a self-contained transmission starting with a downlink transmission and ending with an uplink transmission. In some embodiments, an ITC may contain one or more subframes 325 operating contiguously upon medium occupation. In some cases, there may be a maximum of eight network operators in an A-INT 310 (e.g., with duration of 2 ms) assuming a 250-μs transmission opportunity.

Although three operators are illustrated in FIG. 3, it should be understood that fewer or more network operating entities may be configured to operate in a coordinated manner as described above. In some cases, the location of the G-INT, O-INT, or A-INT within the superframe 305 for each operator is determined autonomously based on the number of network operating entities active in a system. For example, if there is only one network operating entity, each sub-interval 320 may be occupied by a G-INT for that single network operating entity, or the sub-intervals 320 may alternate between G-INTs for that network operating entity and O-INTs to allow other network operating entities to enter. If there are two network operating entities, the sub-intervals 320 may alternate between G-INTs for the first network operating entity and G-INTs for the second network operating entity. If there are three network operating entities, the G-INT and O-INTs for each network operating entity may be designed as illustrated in FIG. 3. If there are four network operating entities, the first four sub-intervals 320 may include consecutive G-INTs for the four network operating entities and the remaining two sub-intervals 320 may contain O-INTs. Similarly, if there are five network operating entities, the first five sub-intervals 320 may contain consecutive G-INTs for the five network operating entities and the remaining sub-interval 320 may contain an O-INT. If there are six network operating entities, all six sub-intervals 320 may include consecutive G-INTs for each network operating entity. It should be understood that these examples are for illustrative purposes only and that other autonomously determined interval allocations may be used.

It should be understood that the coordination framework described with reference to FIG. 3 is for illustration purposes only. For example, the duration of the superframe 305 may be more or less than 20 ms. Also, the number, duration, and location of sub-intervals 320 and subframes 325 may differ from the configuration illustrated. Also, the types of resource designations (e.g., exclusive, prioritized, unassigned) may differ or include more or less sub-designations.

5G NR networks allow for UEs to aperiodically transmit sounding reference signals (SRS). To implement aperiodic SRS (ap-SRS), a base station may indicate the timing of SRS transmission to the UE. In NR operations, the SRS trigger may be included in a downlink control information (DCI) message, while any slot offset for the transmission may be configured via RRC signaling. The DCI message may include downlink or uplink grants or maybe a transmit power control (TPC) DCI. However, in NR-U networks, because multiple nodes compete for shared communication spectrum, UEs should send uplink transmissions without gaps, in order to protect access to the shared spectrum. Thus, SRS and uplink data (e.g., PUSCH) should be transmitted together.

FIGS. 4A and 4B are block diagrams illustrating portions of NR-U network 40 where UE 1 and UE 2 are implemented for ap-SRS. FIGS. 4A and 4B illustrate scenarios in which the current system for implementing ap-SRS may experience limitations based on the potential for large offset values. As illustrated in FIG. 4A, base station 105 begins a long downlink burst 400 in which the SRS trigger is included in a DCI 401 located early in long downlink burst 400. Because long downlink burst 400 is then followed then by a short uplink burst 402, base station 105 would further provide a large offset value, k, in RRC signaling. Similarly, as illustrated in FIG. 4B, base station 105 has a shorter downlink burst 404 with SRS triggers in DCI signals 405 and 406 for UE 1 and UE 2 to transmit SRS 408 and 410 in longer, combined uplink bursts 407 and 409 for UE 1 and UE 2. In such scenario, base station 105 would communicate a large offset value, k, to UE 2 via RRC signaling. Where a large offset value, k, is used to accommodate the longer downlink or uplink bursts, using a fixed offset will not work, as the channel occupancy time (COT) is updated after DCI triggers in DCIs 401, 405, and 406. As such, the overhead and complexity of the signaling from base station 105 is increased.

Various aspects of the present disclosure are directed to providing more transmission opportunities for ap-SRS and increasing the flexibility for base station management without increasing the bit-width of the standard slot offset configuration. In a first aspect, SRS transmission time may be provided as a function of the standard offset and the UE-specific SRS trigger in addition to one or more of additional timing or offset information provided by group common control signaling (e.g., group common physical downlink control channel (GC-PDCCH)), and uplink grant information. In a second aspect, multiple transmission opportunities may be created by adding multiple slot offsets associated with the standard and additional timing offsets.

Figure 5:
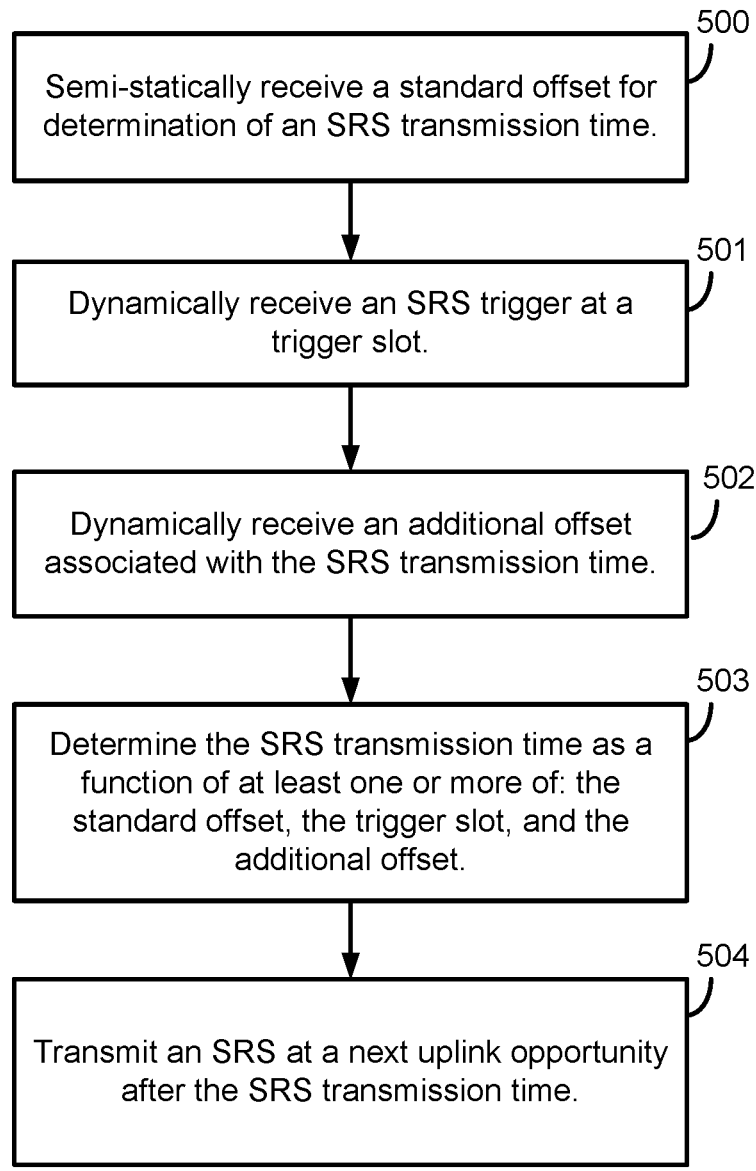
FIG. 5 is a block diagram illustrating example blocks executed to implement one aspect of the present disclosure.
Figure 10:
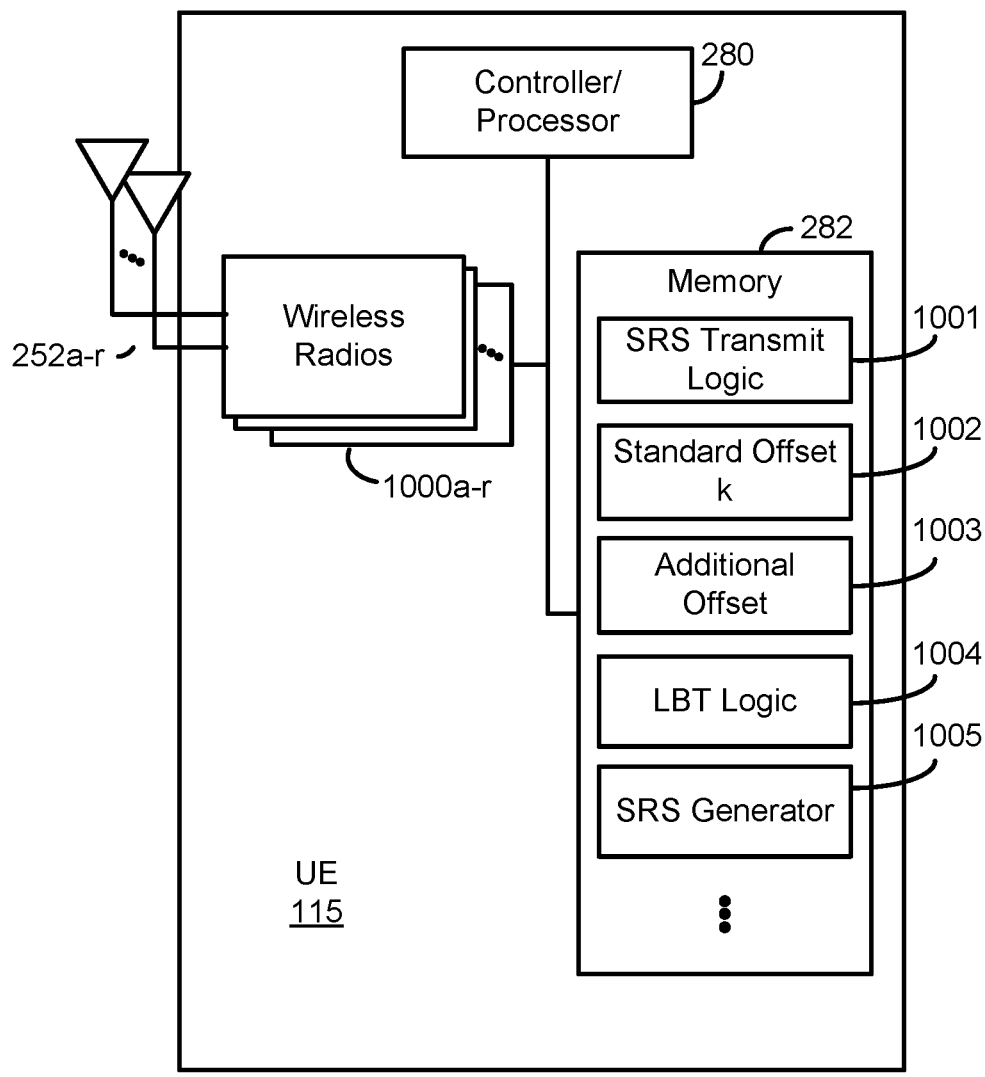
FIG. 10 is a block diagram illustrating an example UE configured according to aspects of the present disclosure.

FIG. 5 is a block diagram illustrating example blocks executed to implement one aspect of the present disclosure. The example blocks will also be described with respect to UE 115 as illustrated in FIG. 10. FIG. 10 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 1000*a-r* and antennas 252*a-r*. Wireless radios 1000*a-r* includes various components and hardware, as illustrated in FIG. 2 for UE 115, including modulator/demodulators 254*a-r*, MIMO detector 256, receive processor 258, transmit processor 264, and TX MIMO processor 266.

At block 500, a UE semi-statically receives a standard offset for determination of an SRS transmission time. In operating the aperiodic SRS timing aspect of the present disclosure, a UE, such as UE 115, under control of controller/processor 280, executes SRS transmit logic 1001, stored in memory 282. The execution environment of SRS transmit logic 1001 provides the functionality for determining SRS transmission timing according to the various aspects of the present disclosure. Further within the execution environment of SRS transmit logic 1001, UE 115 may receive a standard offset, k, from a base station on semi-static signaling (e.g., RRC signaling) via antennas 252*a-r* and wireless radios 1000*a-r*. UE 115 may store this standard offset in memory 282 at standard offset k 1002.

At block 501, the UE dynamically receives an SRS trigger at a trigger slot. For example, UE 115 may monitor for signaling from its serving base station. The serving base station will occasionally send an SRS trigger signal to UE 115 using dynamic signaling, such as DCI, PDCCH, etc. UE 115 monitors signals detected via antennas 252*a-r* and wireless radios 1000*a-r*. UE 115 may detect such an SRS trigger an initiate determination of an SRS timing within the execution environment of SRS transmit logic 1001.

At block 502, the UE dynamically receives an additional offset associated with the SRS transmission time. According to the aspects of the present disclosure, UE 115 may receive an additional offset from the serving base station, which UE 115 stores in memory 282 at additional offset 1003. The downlink messaging with the additional offset may be dynamic signaling, such as a GC-PDCCH. In an additional aspect, the downlink control message carrying the additional offset will also include LBT information for UE 115. Thus, the serving base station may indicate whether UE 115 should perform an abbreviated LBT (e.g., category 2 LBT) or a full LBT (e.g., category 4 LBT) when attempting access to the shared communication channel for uplink transmissions.

At block 503, the determines the SRS transmission time as a function of the standard offset, the trigger slot, and the additional offset. Within the execution environment of SRS transmit logic 1001, UE 115 recognizes the additional offset for determination of the SRS transmission timing. In one example implementation, UE 115 uses the additional offset to override the standard offset to determine an SRS transmission time of the trigger slot, n, plus the additional offset, A. In an additional example implementation, UE would use the additional offset in addition to the standard offset. Thus, UE 115 would determine and SRS transmission time of the trigger slot, n, plus the standard offset, k, plus the additional offset, A. The execution environment may also provide for functionality to determine which slot to start adding the offset. For example, the offset (k, or k+Δ) may be applied from the trigger slot, n, from a granted uplink slot, from the next available flexible slot, or from an explicit reference time indicated in the downlink control messaging from which the additional offset was received.

At block 504, the UE transmits an SRS at a next uplink opportunity after the SRS transmission time. Once UE 115 determines the SRS transmission timing, it executes, under control of controller/processor 280, LBT logic 1004, stored in memory 282. The execution environment of LBT logic provides UE 115 with LBT functionality. Depending on whether UE 115 will perform an abbreviated LBT (e.g., category 2 LBT) or a full LBT (e.g., category 4 LBT), the functionality for performing such LBT procedure is provided within the execution environment of LBT logic 1004. The serving base station may include the type of LBT procedure for UE 115 to perform along with the additional offset. If the LBT procedure is successful, UE 115 will execute, under control of controller/processor 280, SRS generator 1005, stored in memory 282. The execution environment of SRS generator 1005 provides the functionality for UE 115 to generate an SRS and, within the execution environment of SRS transmit logic 1001, will transmit the SRS via wireless radios 1000*a-r* and antennas 252*a-r* at the determined SRS transmission time.

Figure 6C:
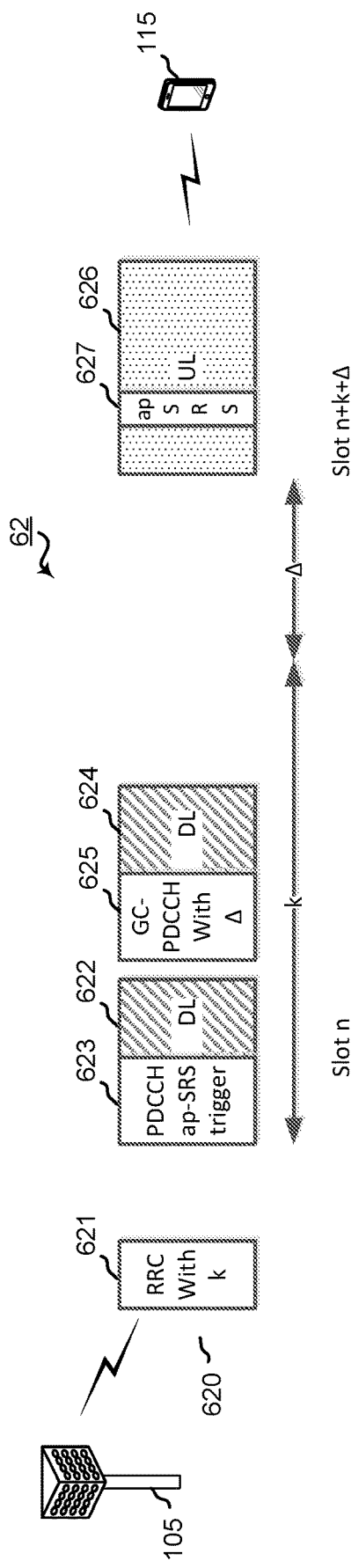
Figure 6D:
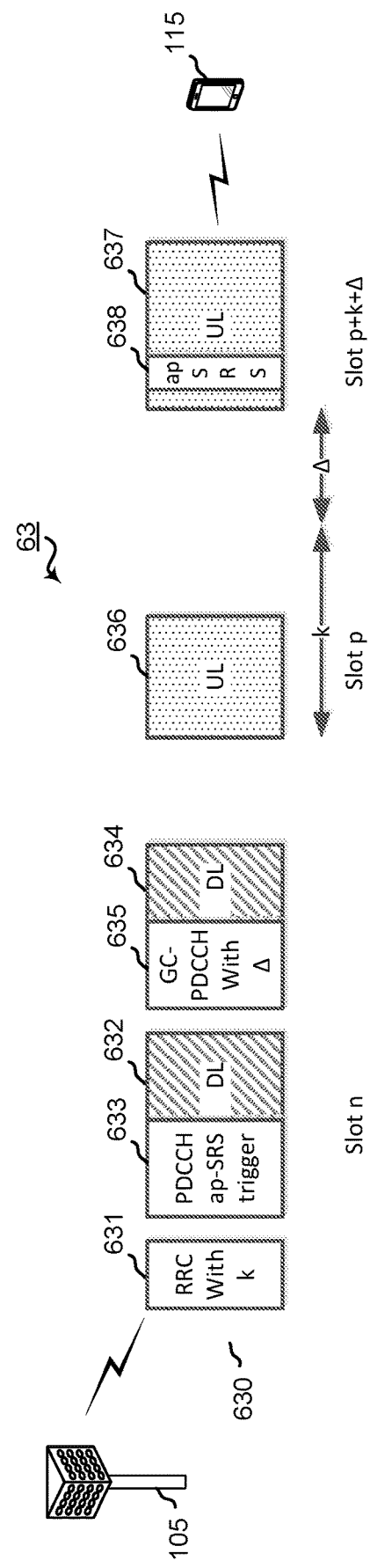

FIG. 6A is a block diagram illustrating a portion of NR-U network 60 having UE 115 configured for ap-SRS transmissions. FIGS. 6B-6D are block diagrams illustrating portions of NR-U networks 61-63 having UE 115 configured for ap-SRS transmissions according to aspects of the present disclosure. Under the existing framework for ap-SRS transmission, as illustrated in FIG. 6A, base station 105 provides the SRS transmission time as a function of the standard offset and the SRS trigger. RRC signaling 611 from base station 105 over shared communication channel 600 provides UE 115 the standard offset, k, of slots that identifies the ap-SRS transmission time after the SRS trigger. For example, after receiving the standard offset, k, and the SRS trigger within a downlink control message 603 (e.g., PDCCH) of a downlink transmission 602 at slot n, UE 115 may initiate ap-SRS transmission 605 at an uplink transmission slot 616 of slot n+k. According to the various aspects of the present disclosure, additional timing flexibility may be provided for base station 105 to schedule ap-SRS transmission 605. The additional timing flexibility may be provided via an additional offset received more dynamically, such as through downlink control information (DCI) messaging.

It should be noted that, while referred to herein as the standard offset, k, the value of k may be selected by base station 105 according to current network configuration or conditions. Such value of k may be a fixed offset value or may be a semi-static value set via the RRC signaling.

As illustrated in FIG. 6B, base station 105 transmits RRC signaling 611 via shared communication channel 610 to UE 115 that includes the standard offset, k, for defining the ap-SRS transmission time. During downlink transmission slot 612, slot n, base station 105 sends an SRS trigger along with downlink control signaling 613 (e.g., PDCCH). UE 115 would begin scheduling of the ap-SRS transmission for slot n+k. However, at a subsequent downlink slot 614, base station 105 provides an additional offset, Δ, to UE 115. The additional offset, Δ, may also be carried in downlink control signaling 615, such as GC-PDCCH. According the illustrated aspect, UE 115 is configured to use the additional offset, Δ, to override the standard offset, k, in determining the ap-SRS transmission time. Thus, after receiving the additional offset, Δ, from base station 105 in downlink control signaling 615, UE 115 determines to send ap-SRS transmission 617 in uplink transmission slot 616 at slot n+Δ.

As noted above, the COT is updated after sending the SRS trigger. Therefore, base station 105 may adjust the offset timing for UE 115 to schedule ap-SRS transmission 617 by sending the adjustment as the additional offset, Δ.

As illustrated in FIG. 6C, UE 115 may be configured to use both the standard offset, k, and the additional offset, Δ, in scheduling the ap-SRS transmission. For example, base station 105 transmits the standard offset, k, over shared communication channel 620 using RRC signaling 621, and sends the SRS trigger in a downlink control signal 623 of a downlink transmission 622 and the additional offset, Δ, in separate downlink control message 625 (e.g., PDCCH, GC-PDCCH, etc.) of downlink transmission slot 624. According to the alternative aspect illustrated in FIG. 6C, UE 115 is configured to use the additional offset, Δ, in addition to the standard offset, k. Thus, once UE 115 receives the additional offset, Δ, it schedules ap-SRS transmission 627 for uplink transmission slot 626, slot n+k+Δ.

In a further alternative aspect illustrated in FIG. 6D, the offset timing used by UE 115 to schedule ap-SRS transmission 638 may be started from the slot on which UE 115 is allocated to begin uplink transmissions 636, slot p. As such, base station 105 transmits the standard offset, k, using RRC signaling 631 on shared communication channel 630, and sends the SRS trigger in a downlink control signal 633 of a downlink transmission 632 and the additional offset, Δ, in separate downlink control message 635 (e.g., PDCCH, GC-PDCCH, etc.) of downlink transmission slot 634. However, according to the illustrated aspect, UE 115 is configured to schedule ap-SRS transmission 638 using the timing offsets from the slot beginning granted uplink transmission 636 for UE 115, slot p. Accordingly, instead of applying the additional offset, Δ, from slot n, when UE 115 receives the SRS trigger, UE 115 is configured to apply the additional offset, Δ, from the next granted uplink slot 636, slot p. Thus, UE 115 schedules ap-SRS transmission 638 for uplink transmission slot 637, slot p+k+Δ.

As illustrated in the example aspects illustrated in FIGS. 6B-6D, the scheduling of ap-SRS transmissions (ap-SRS transmissions 617, 627, and 638) may be based on the standard offset and the UE-specific SRS trigger, but also using an additional timing offset provided in additional downlink control signaling (downlink control messages 615, 625, and 635). Thus, the ap-SRS transmission timing information is derived from two separate downlink control signals (e.g., DCIs, PDCCH, GC-PDCCH, etc.). This additional timing offset provided via a more dynamic signaling mechanism provides more flexibility to base station 105 in effecting scheduling of ap-SRS transmissions. The downlink control messaging carrying the additional offset, Δ, may further include listen before talk (LBT) information, such as whether UE 115 is to conduct either an abbreviated or full LBT procedure (e.g., Category 2 LBT or Category 4 LBT) prior to uplink transmissions on the shared communication spectrum.

UE 115 may be configured, either via standards or explicit signaling from base station 105, to interpret the additional timing offset differently when scheduling ap-SRS transmissions (ap-SRS transmissions 617, 627, and 638). For example, in additional to scheduling the ap-SRS transmission based on the standard offset and SRS trigger, UE 115 may be configured to interpret the additional offset, Δ, based on the trigger time at slot n. Alternatively, UE 115 may be configured to interpret the additional offset, Δ, based either on the start of a granted uplink slot for UE 115, or on the start of a flexible symbol. In a further alternative aspect, UE 115 may be configured to interpret the additional offset, Δ, based on an explicit reference time indicated in the downlink control message on which the additional offset, Δ, was received (e.g., GC-PDCCH, etc.). UE 115 may further be configured to use the additional offset, Δ, to either override the standard offset, k, or add to the standard offset, k.

It should be noted that when UE 115 is configured to interpret the additional offset, Δ, based on a granted uplink slot or flexible slot, the number of bits for the additional offset may be small.

Figure 7:
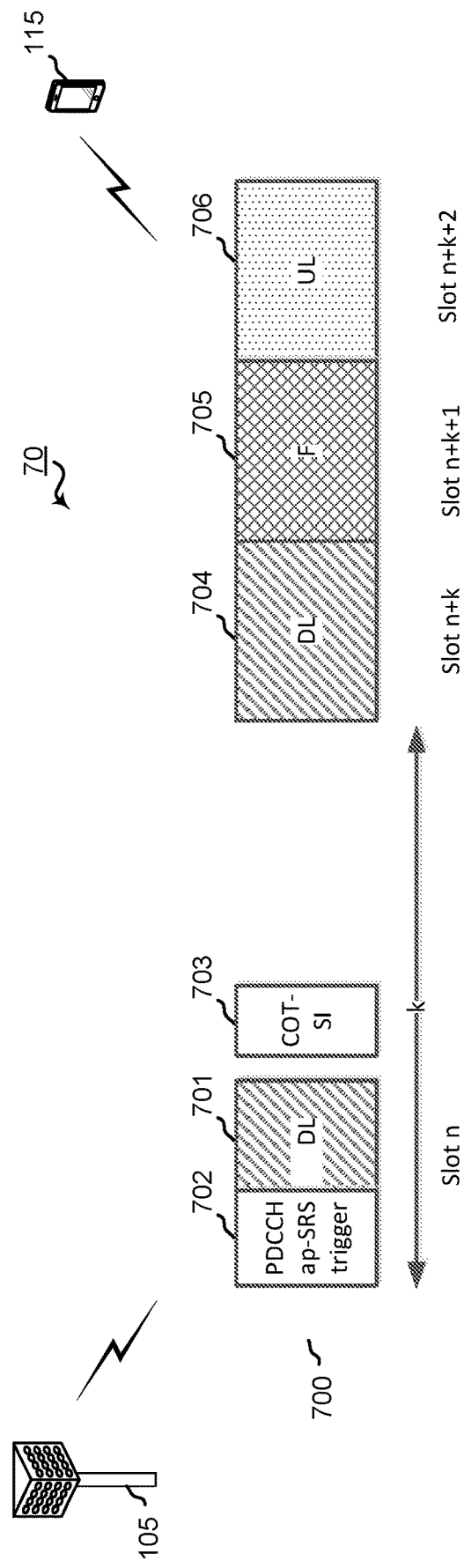
FIG. 7 is a block diagram illustrating a portion of an NR-U network having a UE configured for ap-SRS transmissions according to one aspect of the present disclosure.

FIG. 7 is a block diagram illustrating a portion of NR-U network 70 having a UE 115 configured for ap-SRS transmissions according to one aspect of the present disclosure. The slot/symbol configuration for transmissions within NR-U network 70 may not provide a configuration that coincides with the resulting schedule of SRS transmission. In existing proposals, where ap-SRS transmission is triggered on shared communication channel 700 in downlink control signaling 702 of a downlink transmission slot 701, slot n, the scheduled transmission timing determined by UE 115 using the standard offset, k, may not coincide with an available uplink slot. For example, the configuration at slot n+k may comprise a downlink slot or flexible slot (e.g., downlink slot 703) that UE 115 may not use for uplink transmissions. In such a scenario, the existing suggested solutions allow for UE 115 to transmit SRS at a certain offset, m, where m is the smallest non-negative integer such that slot n+k+m is an uplink slot, such as uplink slot 705. In such proposals, the timing information is derived from a combination of SRS triggering, the standard offset, and the COT system information 703 (COT-SI). Thus, UE 115 determines the slot/symbol information from COT-SI 703.

Flexible slots/symbols may be treated differently by base stations and UEs. Thus, in order for a UE, such as UE 115, to determine whether it may transmit on flexible slot 704, UE 115 would be in synchronization with base station 105. Otherwise, base station 105 would perform multiple hypotheses to detect the SRS location. As illustrated in FIG. 7, downlink slot 704, at slot n+k, is a downlink slot, while slot n+k+1 is flexible slot 705, and slot n+k+2 is uplink slot 706. Aspects of the present disclosure provide for rules to define when UE 115 may use flexible slot 705 for ap-SRS transmission.

In a first example aspect, NR-U network 70 would configure UE 115 for ap-SRS transmissions only in uplink slots/symbols. Thus, after determining that slot n+k is downlink slot 704, UE 115 may schedule ap-SRS transmission at the next available uplink slot, uplink slot 706, at slot n+k+2. In a second example aspect, NR-U network 70 would configure UE 115 to allow for ap-SRS transmissions in flexible slots/symbols, as long as the flexible slot/symbol is not used as a downlink or uplink symbol for UE 115 and base station 105 ensures that the flexible slot/symbol is not a guard symbol and is not used as a downlink slot/symbol for other UEs. Thus, UE 115 may schedule ap-SRS transmissions at flexible slot 705, slot n+k+1, when such conditions are met.

In a third example aspect, NR-U network 70 may configure UE 115 to allow SRS transmission in flexible slots/symbols if there are no uplink slots/symbols beyond that the flexible symbol/slot. Otherwise, UE 115 would use the subsequent uplink slot/symbol. For example, if slot n+k+2 were not an uplink slot, UE 115 would be configured to allow ap-SRS transmissions at flexible slot 705, slot n+k+1. However, with slot n+k+2 being uplink slot 706 UE 115 would skip over flexible slot 705, at slot n+k+1, to schedule ap-SRS at the next uplink slot, uplink slot 706 at slot n+k+2.

Figure 8:
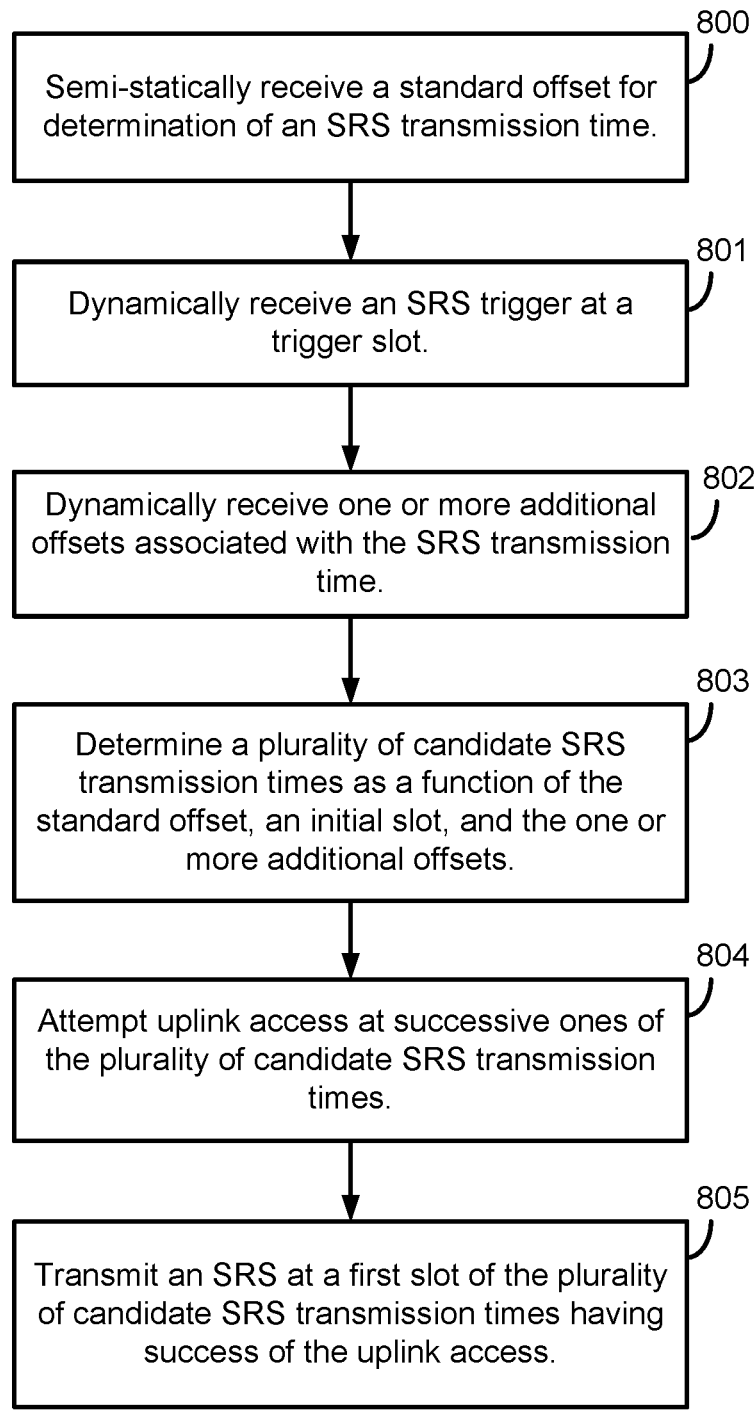
FIG. 8 is a block diagram illustrating example blocks executed to implement one aspect of the present disclosure.

FIG. 8 is a block diagram illustrating example blocks executed to implement one aspect of the present disclosure.

The example blocks will also be described with respect to UE 115 as illustrated in FIG. 10.

At block 800, a UE semi-statically receives a standard offset for determination of an SRS transmission. As noted above with respect to FIG. 5, in operating the aperiodic SRS timing aspect of the present disclosure, UE 115, under control of controller/processor 280, executes SRS transmit logic 1001, stored in memory 282. The execution environment of SRS transmit logic 1001 provides the functionality for determining SRS transmission timing according to the various aspects of the present disclosure. Further within the execution environment of SRS transmit logic 1001, UE 115 may receive a standard offset, k, from a base station on semi-static signaling (e.g., RRC signaling) via antennas 252a-r and wireless radios 1000a-r, which may then be stored in memory 282 at standard offset k 1002.

At block 801, the UE dynamically receives an SRS trigger at a trigger slot. UE 115 monitors signals detected via antennas 252a-r and wireless radios 1000a-r for an SRS trigger via dynamic signaling, such as DCI, PDCCH, etc. Upon detection of such SRS trigger, UE 115 may initiate determination of SRS timing opportunities within the execution environment of SRS transmit logic 1001.

At block 802, the UE dynamically receives one or more additional offsets associated with the SRS transmission time. According to the aspects of the present disclosure, UE 115 may receive multiple additional offsets from the serving base station via dynamic signaling, such as GC-PDCCH, which UE 115 stores in memory 282 at additional offset 1003.

At block 803, the UE determines a plurality of candidate SRS transmission times as a function of the standard offset, an initial slot, and the one or more additional offsets, wherein the initial slots includes one of: the trigger slot, a configured uplink slot, or a configured flexible slot. As Within the execution environment of SRS transmit logic 1001, UE 115 recognizes the multiple additional offsets may be used to determine multiple candidate SRS transmission times. According to one example implementation, UE 115 uses the standard offset and each of the additional offset to determine multiple candidate SRS transmission times. For example, with receipt of three different additional offsets ($\Delta_1$, $\Delta_2$, $\Delta_3$), UE 115 may determine one candidate SRS transmission time at the initial slot, i, (trigger slot, n, uplink slot, p, or flexible slot, f) plus the standard offset, k (slot i+k). UE 115 may determine another candidate SRS transmission time at the initial slot, i, (trigger slot, n, uplink slot, p, or flexible slot, f), plus the standard offset, k, plus the first additional offset, (slot i+k+$\Delta_1$), and another SRS transmission time at the initial slot, i, (trigger slot, n, uplink slot, p, or flexible slot, f), plus the standard offset, k, plus the first additional offset, (slot i+k+$\Delta_2$), and another SRS transmission time at the initial slot, i, (trigger slot, n, uplink slot, p, or flexible slot, f), plus the standard offset, k, plus the first additional offset, (slot i+k+$\Delta_3$).

According to another example implementation, UE 115 receives two additional offsets ($\Delta_1$, $\Delta_2$) and uses the two additional offsets along with the standard offset to define a window based on the initial slot, i, (trigger slot, n, uplink slot, p, or flexible slot, f), between the beginning boundary slot at slot i+k+$\Delta_1$ and the ending boundary slot at slot i+k+$\Delta_2$. UE 115 may then identify any available uplink transmission opportunity between the end points (slot i+k+$\Delta_1$ and slot i+k+$\Delta_2$) of the defined window.

It should be noted that according to the example aspect of FIG. 8, the execution environment may also provide for functionality to determine which slot is the initial slot. For example, the offsets may be applied from the trigger slot, n, from an uplink slot, or from the next available flexible slot.

At block 804, the UE attempts uplink access at successive ones of the plurality of candidate SRS transmission times. Once UE 115 determines the SRS transmission timing, it executes, under control of controller/processor 280, LBT logic 1004, stored in memory 282. The execution environment of LBT logic provides UE 115 with LBT functionality. Depending on whether UE 115 will perform an abbreviated LBT (e.g., category 2 LBT) or a full LBT (e.g., category 4 LBT), the functionality for performing such LBT procedure is provided within the execution environment of LBT logic 1004. The serving base station may include the type of LBT procedure for UE 115 to perform along with the additional offsets. UE 115 will perform an LBT procedure at each of the determined SRS transmission times to determine if UE 115 may access the shared communication channel. If an LBT procedure fails, UE 115 will move to the next determined SRS transmission time and perform the LBT procedure again.

At block 805, the UE transmits an SRS at a first slot of the plurality of candidate SRS transmission times having success of the uplink access. Once UE 115 detects a successful LBT procedure, UE 115 will execute, under control of controller/processor 280, SRS generator 1005, stored in memory 282. The execution environment of SRS generator 1005 provides the functionality for UE 115 to generate an SRS and, within the execution environment of SRS transmit logic 1001, will transmit the SRS via wireless radios 1000a-r and antennas 252a-r at the determined SRS transmission time.

Figure 9A:
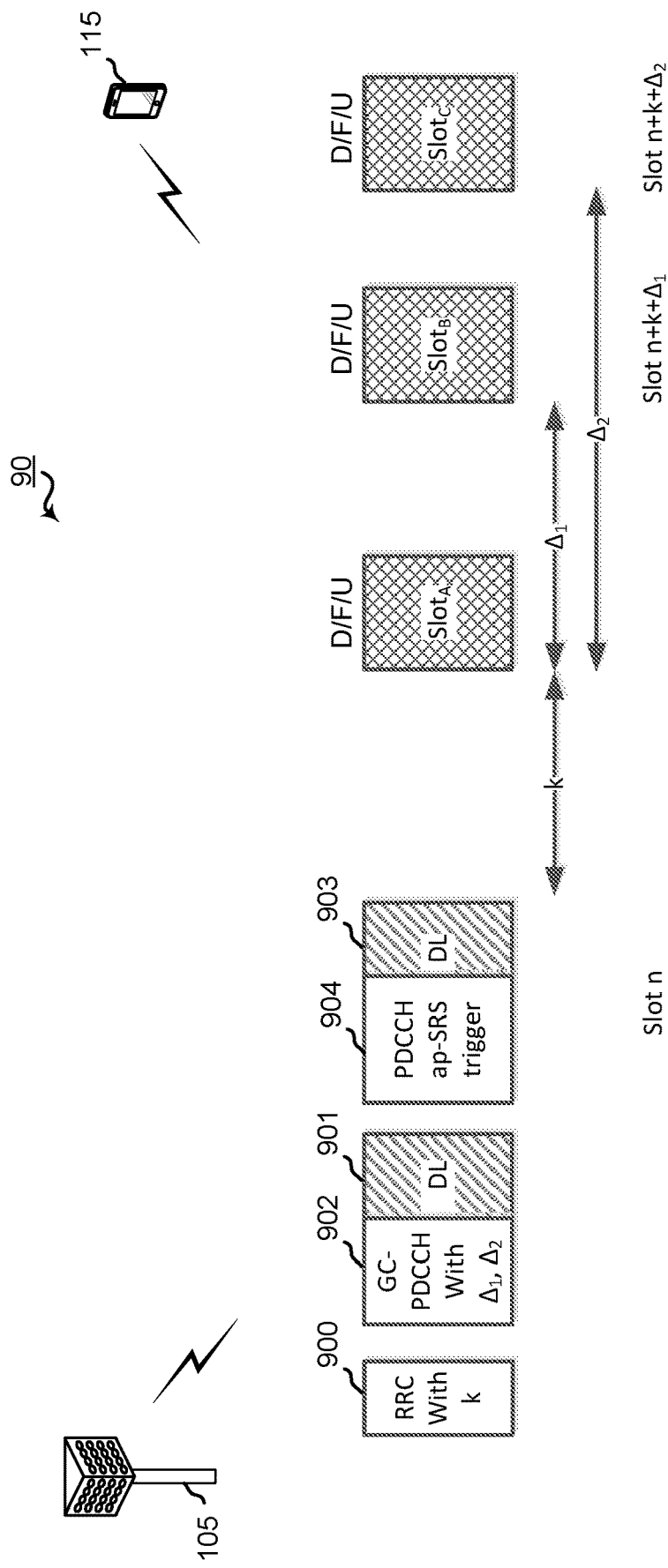
FIGS. 9A and 9B are block diagrams illustrating portions of an NR-U network having a base station and UE configured according to aspects of the present disclosure to provide multiple SRS transmission opportunities.
Figure 9B:
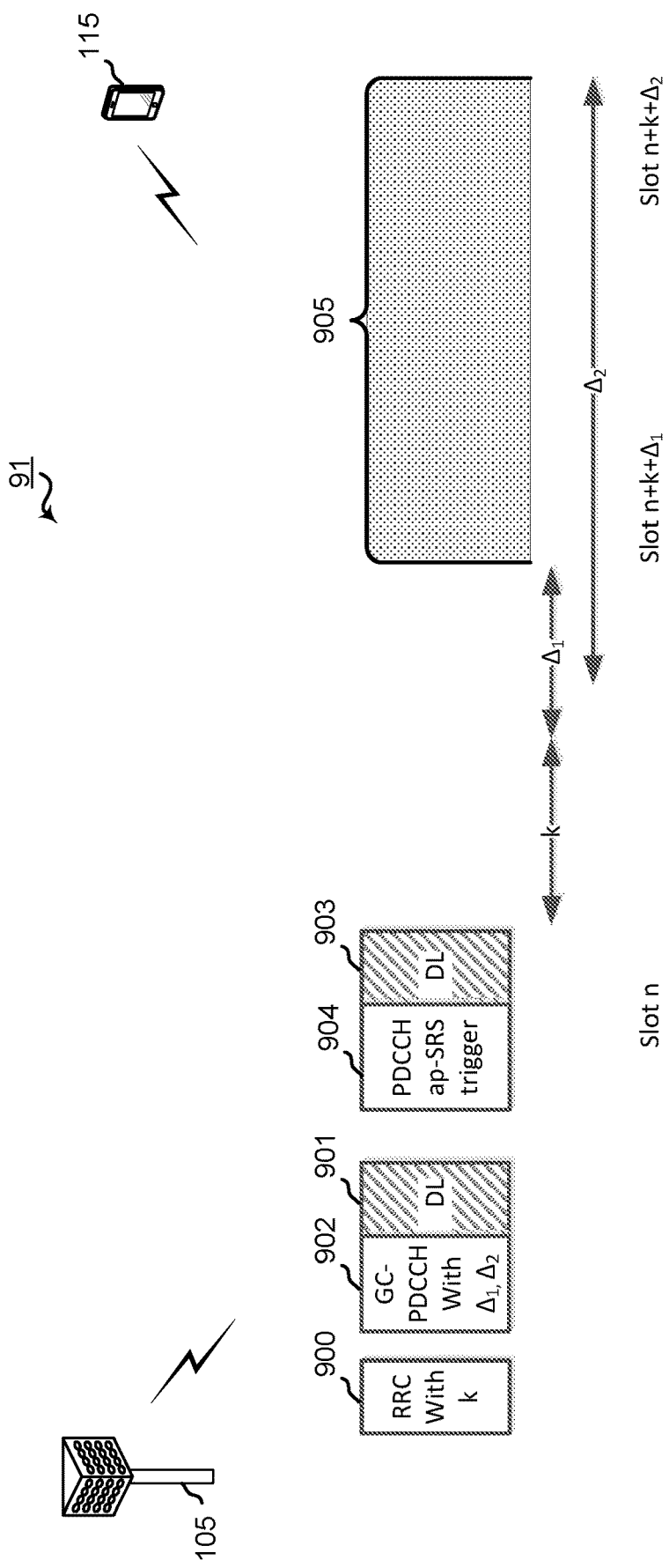

FIGS. 9A and 9B are block diagrams illustrating portions of NR-U networks 90 and 91 having base station 105 and UE 115 configured according to aspects of the present disclosure to provide multiple SRS transmission opportunities. In order to combat LBT failure, multiple SRS transmission opportunities are provided to UE 115. In a first optional aspect, as illustrated by FIG. 9A, multiple transmission opportunities ($Slot_A$, $Slot_B$, $Slot_C$) are created by adding multiple slot offsets between the standard offset, k, and one or more additional offsets, $\Delta_1$-$\Delta_N$ to an initial slot, which may be the trigger slot, a granted uplink slot, or a scheduled flexible or uplink slot. For example, base station 105 sends standard offset, k, via RRC signaling 900, and additional offsets, $\Delta_1$-$\Delta_2$, via GC-PDCCH 902 within downlink transmission slot 901. Once UE 115 receives the SRS trigger via PDCCH 904 of downlink transmission slot 903 at slot n, UE 115 may consider ap-SRS transmission opportunities at $Slot_A$ (slot n+k), $Slot_B$ (slot n+$\Delta_1$), or $Slot_C$ (slot n+$\Delta_2$). UE 115 may use the slot/symbol configuration provided in COT-SI to determine which of $Slot_A$, $Slot_B$, or $Slot_C$ corresponds to a slot/symbol that UE 115 may use for uplink transmissions (e.g., flexible slot/symbol or uplink slot/symbol).

In a second optional aspect, as illustrated by FIG. 9B, multiple transmission opportunities may be created by using the additional offsets to define a window of slots that may be available for ap-SRS transmissions. For example, as described above, base station 105 sends standard offset, k, via RRC signaling 900, and additional offsets, $\Delta_1$-$\Delta_2$, via GC-PDCCH 902 within downlink transmission slot 901. According to the illustrated aspect, once UE 115 receives the SRS trigger via PDCCH 904 of downlink transmission slot 903 at slot n, UE 115 may define a transmission window 905 between slots n+$\Delta_1$ and n+$\Delta_2$. UE 115 may schedule ap-SRS transmissions at an available slot anywhere within transmission window 905. As noted above with respect to the example aspect illustrated in FIG. 9A, UE 115 may use the slot/symbol configuration provided in COT-SI to determine which slot/symbol within transmission window 905 corresponds to a slot/symbol that UE 115 may use for uplink transmissions (e.g., flexible slot/symbol or uplink slot/symbol).

It should be noted that additional example aspects of the present disclosure may provide rules for different interpretations of the additional offsets provided. For example, in a first optional aspect, the additional offset may be interpreted based on the trigger time, slot n. In a second optional aspect, the additional offset may be interpreted based on the start of an uplink or flexible slot, in which case the number of bits for SRS indication may be reduced.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 5 and 8 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
semi-statically receiving, by a user equipment (UE), a standard offset for determination of a sounding reference signal (SRS) transmission time;
dynamically receiving, by the UE, an SRS trigger at a trigger slot;
dynamically receiving, by the UE and via a group common-physical downlink control channel (GC-PDCCH), an additional offset associated with the SRS transmission time;
determining, by the UE, the SRS transmission time as a function of the standard offset, the trigger slot, and the additional offset; and
transmitting, by the UE, an SRS at a next uplink opportunity after the SRS transmission time.

2. The method of claim 1, wherein the determining the SRS transmission time includes one of:
setting the SRS transmission time to an offset slot calculated as the standard offset plus the additional offset from the trigger slot; or
setting the SRS transmission time to the offset slot calculated as the additional offset from the trigger slot.

3. The method of claim 1, further including:
receiving, by the UE, an uplink grant allocating an uplink slot for uplink transmissions, wherein the determining the SRS transmission time includes one of:
setting the SRS transmission time to an offset slot calculated as the standard offset plus the additional offset from the uplink slot; or
setting the SRS transmission time to the offset slot calculated as the additional offset from the uplink slot.

4. The method of claim 1, further including:
detecting, by the UE, system information of a current channel occupancy time (COT) including a slot configuration of the current COT;
determining, by the UE, a first uplink transmission-available slot on or after the SRS transmission time, wherein the first uplink transmission-available slot includes one of: a configured uplink slot or a configured flexible slot, and
wherein the determining the SRS transmission time includes one of:
setting the SRS transmission time to an offset slot calculated as the standard offset plus the additional offset from the first uplink transmission-available slot, wherein the first uplink transmission available slot includes one of: an uplink slot, or a flexible slot; or
setting the SRS transmission time to the offset slot calculated as the additional offset from the first uplink transmission-available slot.

5. The method of claim 4, wherein a first slot one or after the SRS transmission time is the configured flexible slot, the determining the first uplink transmission-available slot includes:
setting a first uplink transmission-available symbol to a first configured flexible symbol of the configured flexible slot in response to one of:
determining there are no configured uplink symbols in the slot configuration after the first configured flexible symbol; or
determining there are no downlink transmissions scheduled for the first configured flexible symbol or no uplink grant for the UE at the first configured flexible symbol.

6. A method of wireless communication, comprising:
semi-statically receiving, by a user equipment (UE), a standard offset for determination of a sounding reference signal (SRS) transmission;
dynamically receiving, by the UE, an SRS trigger at a trigger slot;
dynamically receiving, by the UE and via a group common-physical downlink control channel (GC-PDCCH), one or more additional offsets associated with a SRS transmission time;
determining, by the UE, a plurality of candidate SRS transmission times as a function of the standard offset, an initial slot, and the one or more additional offsets, wherein the initial slots includes one of: the trigger slot, a configured uplink slot, or a configured flexible slot;
attempting, by the UE, uplink access at successive ones of the plurality of candidate SRS transmission times; and
transmitting, by the UE, an SRS at a first slot of the plurality of candidate SRS transmission times having success of the uplink access.

7. The method of claim 6, wherein the determining the plurality of candidate SRS transmission times includes:
identifying SRS transmission times at the standard offset plus the initial slot and the standard offset plus each of the one or more additional offsets plus the initial slot.

8. The method of claim 6, wherein the determining the plurality of candidate SRS transmission times includes:
identifying a plurality of available slots in a window of slots between the standard offset plus a first additional offset of the one or more additional offsets plus the initial slot and the standard offset plus a second additional offset of the one or more additional offsets plus the initial slot.

9. An apparatus configured for wireless communication, the apparatus comprising:
at least one processor; and
a memory coupled to the at least one processor,
wherein the at least one processor is configured:
to semi-statically receive, by a user equipment (UE), a standard offset for determination of a sounding reference signal (SRS) transmission time;
to dynamically receive, by the UE, an SRS trigger at a trigger slot;
to dynamically receive, by the UE and via a group common-physical downlink control channel (GC-PDCCH), an additional offset associated with the SRS transmission time;
to determine, by the UE, the SRS transmission time as a function of the standard offset, the trigger slot, and the additional offset; and
to transmit, by the UE, an SRS at a next uplink opportunity after the SRS transmission time.

10. The apparatus of claim 9, wherein the configuration of the at least one processor to determine the SRS transmission time includes configuration of the at least one processor to one of:
set the SRS transmission time to an offset slot calculated as the standard offset plus the additional offset from the trigger slot; or
set the SRS transmission time to the offset slot calculated as the additional offset from the trigger slot.

11. The apparatus of claim 9, further including configuration of the at least one processor:
   to receive, by the UE, an uplink grant allocating an uplink slot for uplink transmissions, wherein the configuration of the at least one processor to determine the SRS transmission time includes configuration of the at least one processor to one of:
      set the SRS transmission time to an offset slot calculated as the standard offset plus the additional offset from the uplink slot; or
      set the SRS transmission time to the offset slot calculated as the additional offset from the uplink slot.

12. The apparatus of claim 9, further including configuration of the at least one processor:
   to detect, by the UE, system information of a current channel occupancy time (COT) including a slot configuration of the current COT;
   to determine, by the UE, a first uplink transmission-available slot on or after the SRS transmission time, wherein the first uplink transmission-available slot includes one of: a configured uplink slot or a configured flexible slot, and
   wherein the configuration of the at least one processor to determine the SRS transmission time includes configuration of the at least one processor to one of:
      set the SRS transmission time to an offset slot calculated as the standard offset plus the additional offset from the first uplink transmission-available slot, wherein the first uplink transmission available slot includes one of: an uplink slot, or a flexible slot; or
      set the SRS transmission time to the offset slot calculated as the additional offset from the first uplink transmission-available slot.

13. The apparatus of claim 12, wherein a first slot one or after the SRS transmission time is the configured flexible slot, the configuration of the at least one processor to determine the first uplink transmission-available slot includes configuration of the at least one processor:
   to set a first uplink transmission-available symbol to a first configured flexible symbol of the configured flexible slot in response to results of configuration of the at least one processor to one of:
      determine there are no configured uplink symbols in the slot configuration after the first configured flexible symbol; or
      determine there are no downlink transmissions scheduled for the first configured flexible symbol or no uplink grant for the UE at the first configured flexible symbol.

14. An apparatus configured for wireless communication, the apparatus comprising:
   at least one processor; and
   a memory coupled to the at least one processor,
   wherein the at least one processor is configured:
      to semi-statically receive, by a user equipment (UE), a standard offset for determination of a sounding reference signal (SRS) transmission;
      to dynamically receive, by the UE, an SRS trigger at a trigger slot;
      to dynamically receive, by the UE and via a group common-physical downlink control channel (GC-PDCCH), one or more additional offsets associated with a SRS transmission time;
      to determine, by the UE, a plurality of candidate SRS transmission times as a function of the standard offset, an initial slot, and the one or more additional offsets, wherein the initial slots includes one of: the trigger slot, a configured uplink slot, or a configured flexible slot;
      to attempt, by the UE, uplink access at successive ones of the plurality of candidate SRS transmission times; and
      to transmit, by the UE, an SRS at a first slot of the plurality of candidate SRS transmission times having success of the uplink access.

15. The apparatus of claim 14, wherein the configuration of the at least one processor to determine the plurality of candidate SRS transmission times includes configuration of the at least one processor to identify SRS transmission times at the standard offset plus the initial slot and the standard offset plus each of the one or more additional offsets plus the initial slot.

16. The apparatus of claim 14, wherein the configuration of the at least one processor to determine the plurality of candidate SRS transmission times includes configuration of the at least one processor to identify a plurality of available slots in a window of slots between the standard offset plus a first additional offset of the one or more additional offsets plus the initial slot and the standard offset plus a second additional offset of the one or more additional offsets plus the initial slot.

17. The method of claim 1, wherein dynamically receiving, by the UE and via a GC-PDCCH, an additional offset associated with the SRS transmission time comprises receiving, by the UE, the additional offset in a downlink control information (DCI) message, wherein the downlink control message includes listen-before-talk (LBT) information for the UE.

18. The method of claim 17, wherein the LBT information indicates whether the UE is to conduct an abbreviated LBT procedure or a full LBT procedure.

* * * * *